Nov. 13, 1951           C. NIELSEN           2,574,585

REFRIGERATED MILK DELIVERY TRUCK

Filed Sept. 5, 1950           2 SHEETS—SHEET 1

INVENTOR.
CHRISTIAN NIELSEN
BY
ATTORNEY

Nov. 13, 1951    C. NIELSEN    2,574,585
REFRIGERATED MILK DELIVERY TRUCK
Filed Sept. 5, 1950    2 SHEETS—SHEET 2

INVENTOR.
CHRISTIAN NIELSEN
BY
ATTORNEY

Patented Nov. 13, 1951

2,574,585

UNITED STATES PATENT OFFICE 2,574,585

REFRIGERATED MILK DELIVERY TRUCK

Christian Nielsen, Los Angeles, Calif., assignor to Arden Farms Co., Los Angeles, Calif., a corporation of Delaware Application September 5, 1950, Serial No. 183,169

4 Claims. (Cl. 296—24)

1

This invention relates to route trucks employed in the retail delivery of milk and other dairy products and particularly to improvements in the refrigeration facilities on such trucks.

Heretofore the problem of keeping the load of dairy products, carried around a retail route in a milk delivery truck, below the maximum allowable temperature of 50° F. was solved by covering the bottles of milk throughout the day's run with fabric bags filled with cracked ice.

In large operations, the cost of icing the trucks was about a dollar a day and without the driver exercising a high degree of care throughout the day, every day, the refrigeration by the ice was spotty.

It is an object of the present invention to produce a milk delivery truck:

(1) which will have better refrigeration at less expense than the ice pack system which preceded it in general use, and (2) which will not require the meticulous care from the driver required by the ice pack system in order to assure that all portions of the load will be kept cold.

The main reason for the universality of the ice pack system in refrigerating the milk in retail milk route trucks is the necessity for the driver of such a truck to have frequent access to the various cases of bottled dairy products carried therein to select for each customer, as his house is approached, the items needed to fill his order.

With the ice pack system it was practical to have a free and open passage between the driver's compartment, that is, the space where he sits or stands just behind the driver's wheel, and the housed body of the truck rearward therefrom, in which the cases of dairy products are carried. The rear end of the truck housing was provided with a door which was kept closed except when loading or unloading the truck at the beginning or end of a day's run.

That is to say, the interior of the truck body housing was not divided into compartments and this has, until now, been thought unavoidable because of the necessity of frequent free access by the driver to the entire load of goods carried in the truck.

Another object of this invention is to provide a milk route truck which includes a normally closed refrigeration room for the product and yet gives a freedom of access by the driver to the product for filling each order he must select therefrom, which is equal to the free access to the product he enjoyed in the old truck where no

2 partition intervened between the driver and the load of dairy products in the truck.

The manner of accomplishing the foregoing objects, as well as further objects and advantages, will be made manifest in the following description taken in connection with the accompanying drawings.

Figure 1:
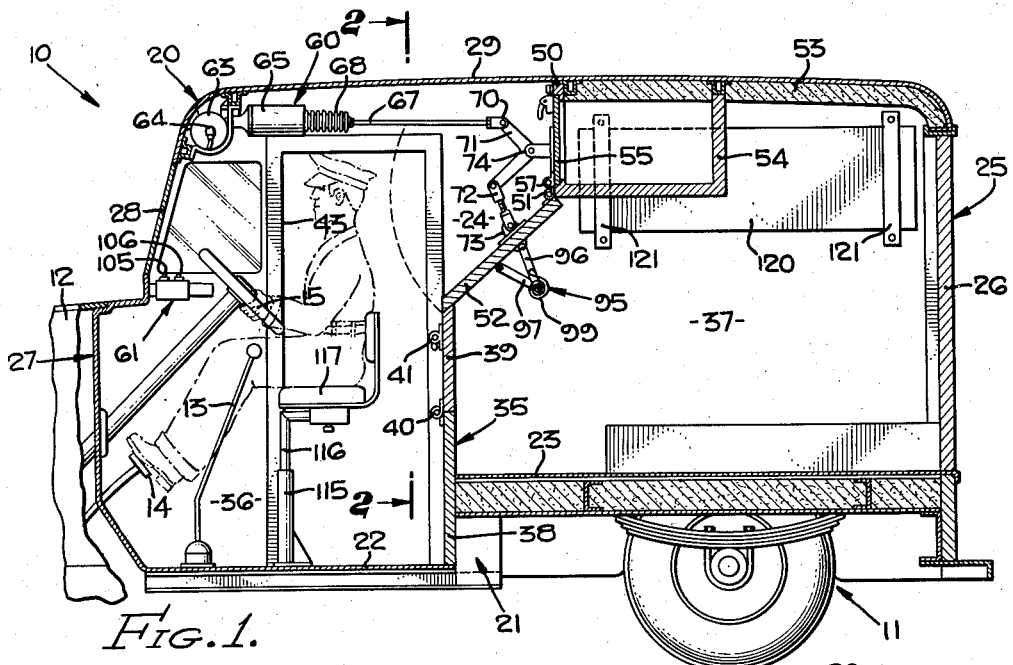
Fig. 1 is a diagrammatic longitudinal vertical sectional view of a preferred embodiment of the invention.

Referring specifically to the drawings, the invention is there shown as embodied in a milk delivery truck 10, including a standard light truck chassis 11, which is provided with a power unit 12, including an internal combustion engine (not shown) and having a gear shift lever 13, clutch and brake pedals 14 and a steering wheel 15 for use in driving said truck.

Mounted on the chassis 11 is a body 20 having a floor 21 which is divided into a forward section 22 and a rear section 23, side walls 24, a back wall 25 having a loading door 26 provided therein, a front wall 27 having a windshield 28 provided therein, and a roof 29.

The space within the housing 20 is divided by a transverse partition 35 into a driver's compartment 36 and a refrigeration chamber 37 (Fig. 1). The floor section 22 is at a lower level than the floor section 23, the interval between these being closed by a lower section 38 of the partition 35. The partition 35 also includes a loading gate 39 which is mounted on the upper edge of the section 38 by hinges 40 and has bolts 41 which are adapted to extend laterally into suitable holes provided in moldings 42 formed on the side walls 24 about passageways 43 through which the driver may enter or leave the compartment 36 at either side of the truck 10.

An upper section 50 of the partition 35 is offset rearwardly from the plane of the portion 38 and gate 39 thereof and is pivotally secured at its lower edge by hinges 51 to a refrigeration chamber service door 52 which, when closed, slopes forwardly and downwardly with its lower edge resting on top of the gate 39.

The roof 29 is provided with an inner layer of cork 53 where this covers the refrigeration chamber 37. Built within this chamber so as to have the upper partition section 50 as the front wall thereof is an auxiliary storage cabinet 54, access to which is had by doors 55 carrying snap locks 56 for holding these closed and which are pivotally mounted on hinges 57 provided on the section 50.

The refrigeration chamber service door 52 has a power actuating mechanism 60 with an electrical control system 61 for controlling the same. The mechanism 60 comprises a vacuum door opening and closing unit which may be any of the standard units commonly employed for this purpose on trucks, busses and the like such as the unit of this type now manufactured by the Bendix Company. It includes a vacuum tank 63, which is connected by a suitable hose 64 to the intake manifold of the truck engine. Air is thus normally kept exacuated from the tank 63 so that a substantially uniform source of vacuum is available at all times for actuating the mechanism 60. This mechanism includes a vacuum cylinder 65 having a piston 66 slidable therein, this being mounted on a rod 67 which is covered where it extends outwardly through the head of cylinder 65 by a Sylphon bellows 68. The rod 67 has a clevis 70 at its end which is pivotally connected to one arm of a bell crank 71 the other end of which pivotally connects to a twin buckle link 72, the lower end of which pivots on a bracket 73 affixed to the door 52. Mounted on the upper partition section 50 is a bracket 74 on which the bell crank 71 pivots.

Figure 3:
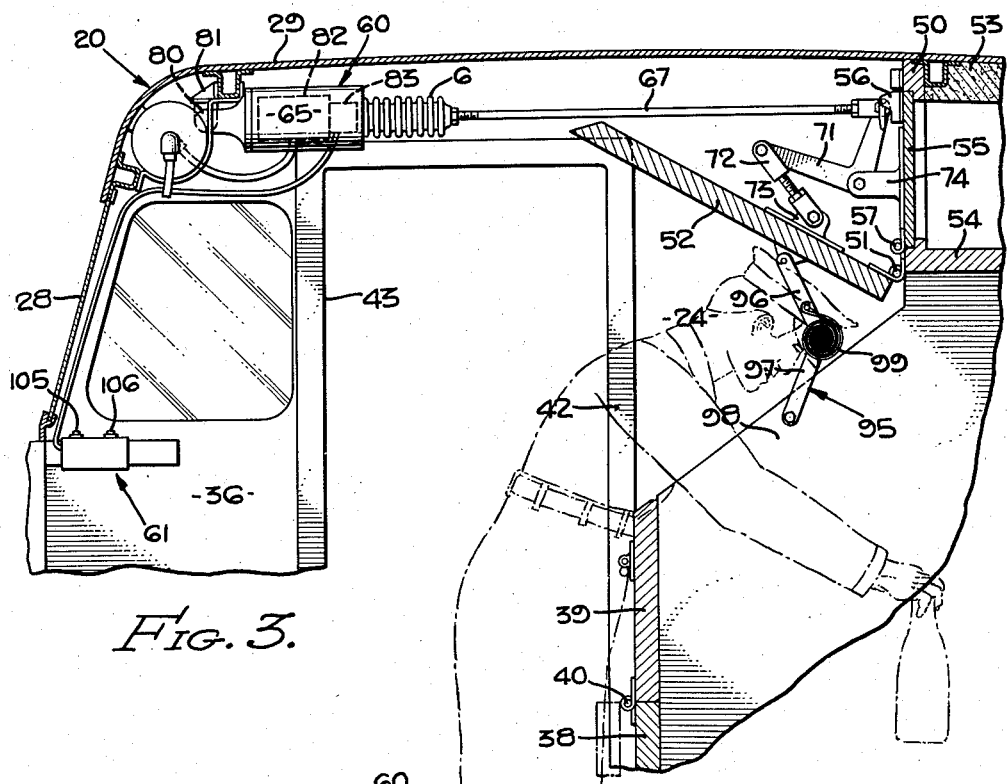
Fig. 3 is an enlarged view of a portion of Fig. 1, showing the refrigeration chamber service door of the invention as when opened.
Figure 4:
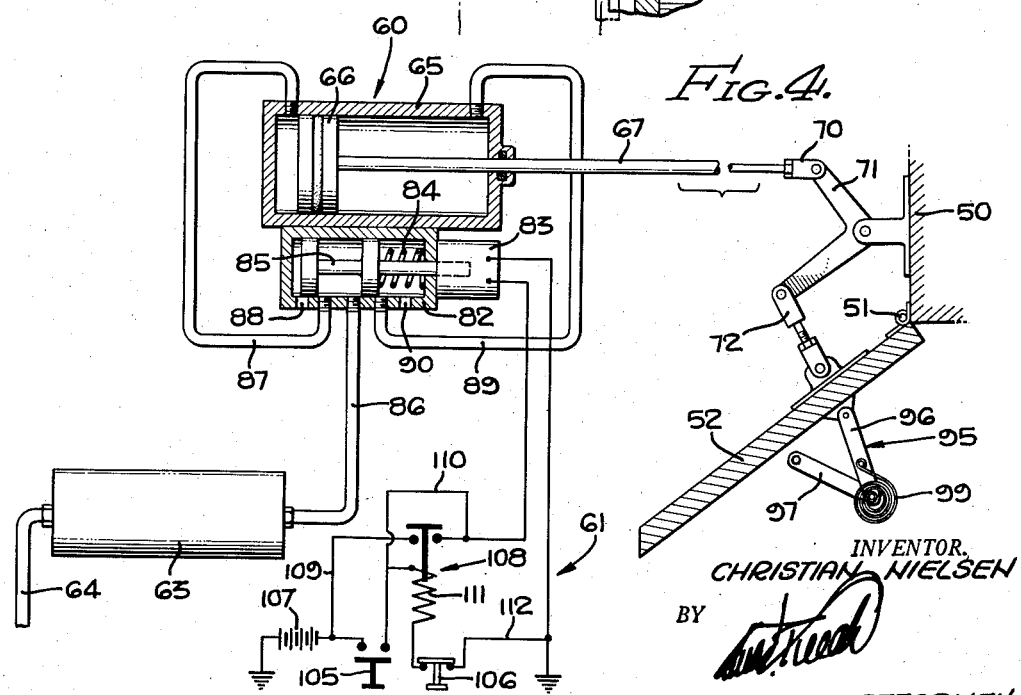
Fig. 4 is a diagrammatic representation of the vacuum power unit preferably employed for the power actuation of said door.

The cylinder 65 is pivotally mounted at 80 on a bracket 81 provided on the roof 29 and is electrically controlled by a valve 82, which is actuated by a solenoid 83. The valve 82 has a spring 84 which normally shifts a valve member 85 to connect pipe 86 leading from vacuum tank 63 with a pipe 87 which connects with the lefthand end of the cylinder 65. When the solenoid 83 is energized, this throws the valve member 85 to the opposite end of the valve 82, thereby connecting the pipe 87 with the atmosphere through a port 88 and connecting vacuum line 86 with a line 89 leading to the righthand end of the cylinder 65, thereby extending the rod 67 from the cylinder and swinging the bell crank 71 to lift the door 52 as shown in Fig. 3. When the solenoid 83 is deenergized, the spring 84 returns the valve member 85 to its normal position as shown in Fig. 4, which connects the vacuum lines 86 and 87 so as to impose a vacuum on the lefthand end of cylinder 65 and connects the righthand end of this cylinder through pipe 89 with a port 90 leading to the atmosphere so that the rod 67 is power retracted to return the door 52 rapidly downwardly into its closed position.

The service door 52 is provided with spring counterbalance devices 95 at its opposite ends to assist in supporting the weight of the door 52 whereby it will rise and fall at the same speeds when actuated by the mechanism 60. Each device 95 includes a pair of arms 96 and 97, the first of which is pivotally connected to the door 52 and the latter of which is pivotally connected to one of the thickened portions 98 of the side walls 24 which comprises insulation for the refrigeration chamber 37. A spiral spring 99 is mounted on each of the devices 95 tending to expand the arms 96 and 97, these springs thus exerting lifting forces against opposite ends of the door 52.

The electrical control system 61 for the mechanism 60 includes a pair of push button switches 105 and 106 and a source of electricity, such as a battery 107 one side of which connects to the ground. Switch 105 is normally open and switch 106 is normally closed, these two being associated with a normally open relay 108. These elements of the electrical system 61 are connected as follows: one side of switch 105 is connected by a conductor 109 to the battery 107 and to one side of relay switch 108. The other side of switch 105 is connected by a conductor 110 to the other side of relay switch 108 and to one side of the solenoid 83. The conductor 110 also connects to one terminal of the coil 111 of relay 108, the other terminal of which connects to one side of switch 106. The other side of switch 106 connects through a conductor 112 to the ground and to the other side of solenoid 83.

Mounted on the floor section 22 in the driver's compartment 36 is a vertical socket 115 which pivotally receives a post 116 of a driver's seat 117.

While any suitable means may be provided for refrigerating the chamber 37, I prefer to refrigerate this by means of units 120 which are supported by brackets 121 on the side walls 24 inside the chamber 37 and which have outside connections (not shown) for connecting a refrigerating plant therewith so as to cool the units 120 down to a sub-zero temperature while the truck 10 is at the plant during the intervals between successive days' runs by the truck.

Although not shown in the drawings, suitable rubber packing of the type ordinarily used on refrigerator doors is preferably provided between doors 26, 52 and 55 and gate 39 and the edges of the openings they close.

Operation

Figure 2:
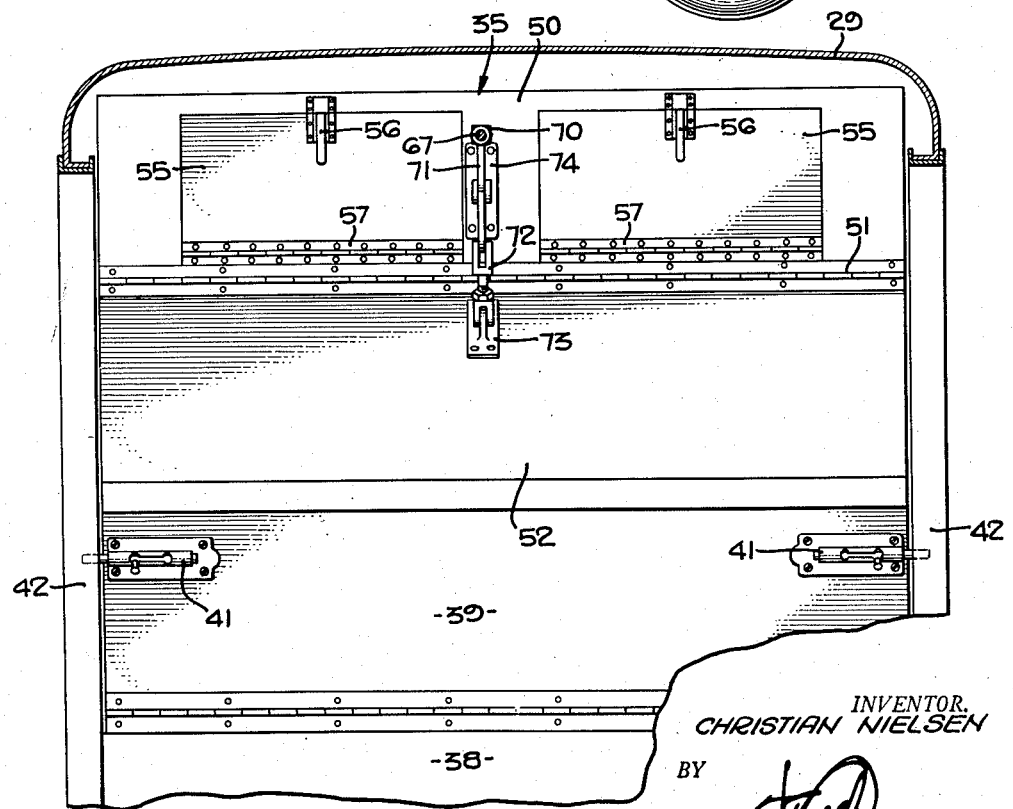
Fig. 2 is a fragmentary enlarged transverse sectional view taken on the line 2—2 of Fig. 1.

After the engine in the power unit 12 has been running a short time, the vacuum tank 63 has the air sufficiently evacuated therefrom to apply suction through pipes 86 and 87 to the lefthand end of the cylinder 65, thereby positively holding the service door 52 downwardly in closed position as shown in Figs. 1, 2 and 4. The door 52 is normally closed and it remains thus until the driver pushes the button 105 of the switch 61. This completes the circuit of the solenoid 83 and energizes the relay switch 108, causing the latter to hold this circuit closed after pressure on the switch 105 is released. When thus energized, the solenoid shifts the valve element 85 from its leftward position to a rightward position, thereby opening the left end of cylinder 65 to the atmosphere and connecting the righthand end of this cylinder through tubes 89 and 86 with the vacuum tank 63. This extends the piston rod 57 to the right, swinging the door 52 to its upward position shown in Fig. 3, and holds the door thus raised by the continued application of vacuum to the righthand end of the cylinder 65.

When the operator desires to lower door 52 to its closed position, he momentarily touches button 106, thereby breaking the circuit of the relay switch 108 which, in turn, breaks the power circuit of the solenoid 83, permitting the spring 84 to return the valve member 85 to its leftward position as shown in Fig. 4. This connects the righthand end of the cylinder 85 with the atmosphere and applies suction to the lefthand end of this cylinder, thereby swinging the door 52 downwardly under power to its closed position.

After the truck 10 comes in from a day's run, and pending its being taken out the following morning, the refrigeration units 120 are hooked up with an ammonia circulation refrigerating system which cools these units to a temperature of approximately 18° F. and also chills the air in the refrigeration chamber 37 and the walls surrounding the same to a temperature below freezing.

To load the truck 10, the service door 52 is lifted as above described to its open position shown in Fig. 3; the bolts 41 are withdrawn from the molding 42; the gate 39 is swung downwardly 180° about the hinges 40; and the loading door 26 in the rear wall 25 is opened. Various cases of milk and other liquid dairy products, as required, are now loaded into refrigeration chamber 37, and the door 36, gate 39 and service door 52 are closed as shown in Fig. 1.

The auxiliary refrigeration cabinet 54 is for use in storing solid products sold on the route such as butter, cheese and eggs. Access to the cabinet 54 is had through the doors 55, which are accessible only when the service door 52 is lowered.

With the truck 10 properly loaded, the driver is ready to start on his route. As he approaches the residence of each customer, he presses the button 105 while the truck 10 is being brought to a halt. As is obvious from Fig. 1, the seat 117 and the service door 52 are so arranged and spaced from each other that the driver may occupy the seat 117 while the door 52 moves from its closed to its open position, without danger of the driver being struck by the moving door. This constitutes a time-saving feature in that the driver may press the button 105 to initiate opening of the service door 52 far enough in advance so that the door will reach its full open position by the time the vehicle is brought to a stop. Thus, when the truck stops and the driver turns in his seat 117 to assemble the order for this customer, the service door 52 has already reached its upper position shown in Fig. 3, thereby affording the driver complete access to the products stored in the forward portion of the refrigeration chamber 37. He is thus able to quickly reach in and select the bottles of milk, cream or the like required to fill the particular order he is about to deliver and lift these out of the chamber 37. Before leaving the truck 10, he presses the button 106 either with his finger or with an article carried on one hand, so that the door 52 is lowered almost immediately when the need for its being open ceases. After completing his delivery, the driver returns to the truck 10 and drives to the next stop, where the operation of opening the service door 52 and closing the same above described is repeated.

As the service door 52 is being opened to permit the driver to have access to the interior of refrigeration chamber 37, the driver leaves his seat to stand on the compartment floor 22 with the upper edge of the loading gate 39 about level with his waist. When the driver reaches into the chamber 37, as indicated in broken lines in Fig. 3, he is thus able to rest his weight on the upper edge of this gate which at that time is locked in place by the bolts 41 so as to comprise an integral upper portion of the lower partition section 38. It is also to be noted that by virtue of the service door 52 extending transversely the full width of the refrigeration chamber 37, the driver has complete access to said chamber while he is thus resting his weight on the upper edge of the gate 39. This greatly facilitates the removal by the driver from chamber 37 of whatever products he requires in making up a customer's order, as it not only gives him complete access to the full width of said chamber but affords support for his weight while he is reaching into the chamber and lifting out the products he is selecting therefrom.

Whenever an order to a given customer includes products stored in the cabinet 54, these are removed through one of the doors 55, either before or after opening the service door 52 to obtain bottled products from the chamber 37.

From the foregoing description of the operation of my invention, it is clear that I have provided a milk delivery truck having a completely enclosed refrigeration chamber by the use of which ice bag refrigeration may be entirely eliminated. It has been proven in practice in employing the truck of the invention that a lower temperature may be maintained in the chamber 37 throughout a day's run in extremely hot weather than is practical with the ice bag system and this is accomplished while at the same time eliminating the need for the driver to juggle ice bags around over his load throughout the day so as to be certain that each bottle of milk has the proper refrigeration at all times.

It is also believed evident that these advantages in a milk truck are realized in my invention while affording the operator practically as complete and free access to the bottled products in his truck when making up the individual orders of his customers as existed in the old type of milk delivery truck in which the interior of the truck was at all times entirely open to the driver.

In addition to having the above advantages, there is a saving in operating the milk delivery truck of my invention of over two thirds of the cost of refrigeration alone.

The claims are:

1. In a milk delivery truck body, the combination of: a housing including a floor, side walls, a back wall, a front wall and a roof; a generally upright transverse partition dividing the interior of said housing into a driver's compartment disposed forwardly therefrom and a refrigeration chamber disposed rearwardly therefrom, said side walls having passageways opening laterally from said compartment through which the driver may enter and leave the latter, said partition being divided into a lower transverse section and an upper transverse section the latter being set back rearwardly a substantial distance from said lower partition section and spaced upwardly therefrom to provide a service door opening extending substantially the full width of said chamber; a driver's seat in said compartment mounted forwardly of said lower partition section; a service door hinged at its upper edge to the lower edge of said upper partition section and being inclined forwardly and downwardly, when closed, to close the opening between said partition sections, and being inclined forwardly and upwardly in front of said upper partition section, when open, to give the driver full access to said refrigeration chamber; power actuated means in said compartment for moving said door from one of said inclined positions to the other; and driver-operable control means for said power actuated means located in said compartment, said service door being disposed relative to said driver's seat so that it can swing from closed to open position while the driver is seated without danger of striking the driver.

2. A combination as in claim 1 in which an upper transverse portion of the lower transverse section of said partition comprises a gate which is hingedly joined at its lower edge with the balance of said lower section; and locking means for normally holding said gate in vertical upward extension of the balance of said lower section, said locking means being optionally operable to permit said gate to swing downwardly whereby in cooperation with the opening of said service door a relatively large opening is provided in said partition for loading or cleaning out said refrigeration chamber.

3. A combination as in claim 2 which includes an auxiliary cold storage cabinet built into said housing within said chamber, the front end of which cabinet is formed by the set back upper section of said partition; and auxiliary door means provided in said upper section for giving access to said cabinet.

4. A combination as in claim 1 in which said power actuated means includes; a vacuum cylinder having a piston and piston rod and being mounted under said roof near the front end thereof; a bell crank pivotally mounted on said upper set-back section of said partition, an upper arm of said bell crank being pivotally connected to said piston rod; and a link pivotally connected to a lower arm of said bell crank and to said service door, and in which the control means for the power actuated means includes elements for controlling pressure conditions in said vacuum cylinder to control movement of the piston therein.

CHRISTIAN NIELSEN.

REFERENCES CITED

The following references are of record in the file of this patent:

UNITED STATES PATENTS

| Number | Name | Date |
|---|---|---|
| 2,098,357 | Piroumoff | Nov. 9, 1937 |
| 2,168,018 | Hartz | Aug. 1, 1939 |
| 2,194,782 | Baade | Mar. 26, 1940 |
| 2,330,339 | DeMore | Sept. 28, 1943 |

FOREIGN PATENTS

| Number | Country | Date |
|---|---|---|
| 458,619 | Great Britain | Dec. 23, 1936 |